United States Patent Office 3,676,176
Patented July 11, 1972

3,676,176
METHOD OF MAKING FLUORESCENT LAMPS
Willy P. Schreurs, Danvers, and Lawrence W. Kimball, Bedford, Mass., assignors to Sylvania Electric Products Inc.
No Drawing. Filed Sept. 28, 1970, Ser. No. 76,270
Int. Cl. F21k *2/00;* B44d *1/46, 1/48*
U.S. Cl. 117—33.5 L                 7 Claims

ABSTRACT OF THE DISCLOSURE

The inner wall of a tabular, open-ended glass envelope is coated with a phosphor by flushing a liquid phosphor suspension therethrough. In order to improve the uniformity of thickness of the phosphor, the envelope is positioned vertically and the wet phosphor is zone dried while air is passed through the envelope.

BACKGROUND OF THE INVENTION

Field of the invention

This invention relates to the manufacture of fluorescent lamps and especially to the method of coating lamp envelopes with a phosphor.

Description of the prior art

Fluorescent lamps are usually coated by flushing the glass envelope with a suspension of phosphor particles, drying the film, then heating the envelope in order to eliminate organic material from the film. The flushing operation is usually followed by an interval of dripping in order to eliminate most of the liquid from the coating and to even the thickness of the phosphor film throughout the length of the envelope. Drying is achieved by natural or forced evaporation of the solvent. Drying may be concurrent and/or subsequent to the dripping step and heat may be uniformly applied to the entire envelope to speed up the drying process.

While a phosphor film using organic binders such as nitrocellulose dissolved in butyl acetate, or ethylcellulose dissolved in xylol can be dried in about 20 minutes with cold air, a water soluble binder will require the use of hot air to achieve the drying in the same length of time. Since the phosphor film of a fluorescent lamp transforms the ultraviolet energy of the arc discharge into visible energy, in order to achieve maximum efficiency it must absorb maximum ultraviolet radiation and, at the same time,, absorb minimum visible radiation. Both these conditions determine the optimum coating thickness for any given particle size distribution of phosphor crystals. For practical reasons the measure of the coating thickness, or coating weight, is obtained by a measure of the diffuse light transmission through the coated glass bulb. This measure is expressed in arbitrary units on a 0 to 100 scale and referred to in the art as coating density.

Variations of coating density of one unit or more are commonly encountered from end to end in fluorescent lamps when the phosphor is applied according to prior art methods. Although such minor variations can be tolerated in commercial lamps used for general illumination, there are some applications where such variations are objectionable. Typical applications are high color rendition fluorescent lamps used for color matching, grading, inspecting and photocopying processes.

The effect of a variation in coating density is to vary the color and the brightness of the lamp. Such a variation, occurring throughout the length of a single lamp, is particularly objectionable in photocopying processes where the density of the print is a direct function of radiated energy.

An illustration of the effect on brightness of a variation of one unit of coating density is as follows. In a lamp coated with a particular phosphor having an average particle size of 10.1 microns, the brightness at a coating density of 78.5 was 3101 lumens, while the brightness at a coating density of 77.0 was 3072 lumens, 27 lumens less. In this example the coating density of 78.5 corresponds to a phosphor coating weight of 5.0 milligrams per square centimeter of envelope area, while 77.0 corresponds to 4.2 milligrams per square centimeter.

Another disadvantage resulting from a variation in coating density is a variation in the color of light emitted by the phosphor, especially in high color rendering phosphors having a small amount of yellow pigment blended therein, such as are disclosed in U.S. Pat. No. 3,548,237. Because of the presence of the yellow pigment, a density difference of only one unit is sufficient to cause a visible color difference from one end of the lamp to the other. Such a difference is illustrated by the shift in color coordinates, color temperature and color rendering index. In a particular phosphor coating having a density of 79.2, the color coordinates were 0.4625 and 0.4169, the color temperature was 2700° K. and the color rendering index was 90%. But at a density of 78.3, the same respective measurements were 0.4503 and 0.4085, 2825° K. and 88%. These terms are discussed and/or defined in an article entitled "Color Rendering of Light Sources: CIE Method of Specification and is Application" by Dorothy Nickerson and Charles W. Jerome in Illuminating Engineering, April 1965, page 262.

SUMMARY OF THE INVENTION

This invention discloses a process for phosphor coating a fluorescent lamp envelope, which process produces a coating having more uniform thickness than do prior art processes.

A wet layer of phosphor is applied to the inner wall of a tubular glass envelope by commonly used techniques, such as by flushing the envelope with a phosphor suspension. The suspension is admitted into one end of the envelope and is allowed to flow down substantially the entire inner surface of the envelope so as to deposit a wet phosphor layer thereon, the excess suspension flowing out the other end of the envelope.

Immediately after the flushing operation and while the envelope is maintained in a vertical position, the envelope is zone dried while a stream of air is passed upwardly through the envelope. Zone drying is defined as heating a portion only of the lamp envelope for a short period of time then heating the abutting portion of lamp envelope for a short period of time and continuing the process until the entire coating has been heated. In this invention zone drying is preferably commenced at the top of the vertically positioned envelope for several reasons. First, the excess suspension flows downward under the force of gravity. Second, heat reduces the viscosity of the wet coating so that the downward flow of excess suspension is accelerated. And, finally, once the heated coating is set sufficiently so that it no longer flows, there can be no flow thereon of coating from a higher portion of the envelope.

This process is more applicable to phosphor coatings applied from an aqueous suspension than to phosphor coatings applied from an organic liquid suspension, since water evaporates at a slower rate than do the organic solvents, such as butyl acetate, that are commonly used in the organic liquid suspension. Thus an aqueous coating will take longer to dry than an organic liquid coating and the wet aqueous coating can sag or flow to a greater extent than the organic coating, thereby making nonuniformity of coating thickness a greater problem with the aqueous coating.

There are several other variables that affect the rate of evaporation of the solvent from the wet coating. Proper control of these variables, in addition to viscosity control, determine uniformity of the coating.

One of these variables is the local temperature of the coating. A second variable is the velocity of the air stream flowing over the wet coating. Still another variable is the solvent content of the air stream.

When a stream of air is passed through an envelope having wet coating thereon, the concentration of solvent vapor in the air at the exit end of the envelope is higher than the concentration of solvent vapor in the air at the inlet end of the envelope. The effect of this change in concentration of solvent vapor is that the solvent in the wet coating near the inlet end evaporates faster than the solvent in the wet coating near the exit end. Therefore, the coating near the inlet end dries or "sets" faster than the coating near the exit end, and the latter coating can sag or flow for some length of time after the former coating has begun to "set."

In this invention the effect of zone heating the coating near the exit end is to increase the rate of evaporation of solvent therefrom and thereby compensate for the increased concentration of solvent vapor in the air stream thereat. The coating in the initial heating zone need not be heated to complete dryness before the heating zone is moved to the abutting coating, since heating said coating to only partial dryness can prevent any further displacement of the coating relative to the supporting glass envelope.

It should be recognized that in any particular application of this process, the length of the zone and the heating interval thereof will be dependent on the velocity and temperature of the air stream and the composition of the phosphor suspension. Under conditions which cause relatively rapid solvent evaporation from the wet coating, the length of the zone and the heating interval would be relatively short. Under relatively slow evaporation conditions, the zone length and the heating interval would be relatively long.

Where the zone length is substantially greater than about 30% of the envelope length, there can be too great a variation in the thickness of the wet coating layer flowing towards the bottom portion throughout the zone length to attain the uniformity of coating thickness that is the purpose of this invention.

The zone can be heated by electric or flame heaters, the heater preferably surrounding the envelope in order to obtain substantially uniform heating of all of the coating in the zone. Th air stream through the envelope may also be heated somewhat if it is desired to reduce the total drying time for the coated envelope.

In this disclosure zone drying has been described as a series of steps of heating a portion only of the coated envelope at any one time, so that, at intervals, the envelope and the heater are stationary relative to each other. Such a process can attain a uniformity of coating thickness that is satisfactory for purposes of this invention. However, better control and greater uniformity of coating thickness are obtained if there is continuous relative motion between the coated lamp envelope and the heater. Such motion can be either by slowly and continuously drawing the envelope vertically through the stationary heater or by moving the heater downward around the stationary envelope.

DESCRIPTION OF A PREFERRED EMBODIMENT

One example of a lamp prepared in accordance with this invention is as follows. A liquid vehicle was prepared by dissolving 90 grams of polymerized ethylene oxide binder in 3000 ml. of deionized water to which 6 ml. of a liquid surfactant had been added.

To 100 ml. of the liquid vehicle were added 6 grams of finely powdered sub-micron size aluminum oxide, which was thoroughly dispersed therein by ball milling for 6 hours. The 100 ml. of aluminum oxide dispersion was then mixed within 175 ml. of the liquid vehicle, 300 ml. of deionized water and 10 ml. of polyethylene glycol and then 500 grams of antimony-manganese-activated halophosphate phosphor in powder form were added and thoroughly dispersed to prepare the phosphor coating suspension. The suspension had a specific gravity of 1.450 and had a viscosity of 107 centipoises.

An open-ended fluorescent lamp envelope 4 feet long by 1½ inches in diameter, was then coated by flushing the above suspension into the top of the vertical envelope and permitting the excess suspension to flow out of the bottom. After flushing of the suspension, the coated envelope was drawn, top end first, through a circular 500 watt radiant heater at the rate of 0.9 cm. per second. The heater had an inside diameter of 10 cm. and a height of 22 cm. During the zone drying operation, air was drawn from the top end of the envelope at a velocity of 300 feet per minute by inserting a short U-shaped length of ¼ inch glass tubing within the top end of the envelope and passing compressed air through the tubing. The suction created thereby drew air up through the lamp envelope. The time required for coating, dripping and drying was 130 seconds.

The envelope was then passed through an oven at a temperature of 550° C. to volatilize and completely remove all organic matter from the coating. After cooling, the coating density of the phosphor was measured at eight inch intervals along the length of the envelope by the light transmission method mentioned in description of the prior art. The measurements were 78.6, 78.6, 78.4, 78.5 and 78.6, yielding a variation of only 0.2 unit throughout the length of the envelope.

Although air was drawn through the envelope in this example by means of negative air pressure at the top end thereof, positive air pressure, such as from a fan or by compressed air, at the bottom of the envelope could have been used to force air through the envelope.

What we claim is:

1. In the process of manufacturing a fluorescent lamp, the steps which comprise: preparing a suspension of phosphor in a liquid vehicle, said vehicle comprising an organic binder and a solvent; flushing said suspension into the upper end of a substantially vertical open-ended tubular glass envelope so as to deposit a coating of phosphor on the interior wall of said envelope; and zone drying said coating so as to obtain a substantially uniformly thick phosphor coating, said zone drying being effected by heating the top portion only of said envelope for a short period of time, then heating the abutting portion of said envelope for a short period of time and continuing the process of heating abutting portions until the entire coating has been heated, the length of said portions being between about 5% and 30% of the length of said envelope.

2. The process of claim 1 wherein said solvent comprises water.

3. The process of claim 1 wherein said zone drying is effected by a heater surrounding said envelope.

4. The process of claim 1 including the step of forcing air upward through said envelope during the zone drying step.

5. The process of claim 3 wherein said zone drying is accomplished by drawing said envelope upward through said heater.

6. The process of claim 3 wherein said zone drying is accomplished by displacing said heater downward around said envelope.

7. The process of claim 3 wherein the height of said heater is between about 5% and 30% of the length of said envelope.

References Cited

UNITED STATES PATENTS

| | | | |
|---|---|---|---|
| 2,317,977 | 5/1943 | Casellini | 117—33.5 L |
| 2,318,060 | 5/1943 | Cortese | 117—33.5 L |
| 2,344,081 | 3/1944 | Claude | 117—33.5 L |
| 2,413,437 | 12/1946 | Demb et al. | 117—33.5 L |
| 2,706,691 | 4/1965 | Schaefer | 117—33.5 L |
| 3,006,781 | 10/1961 | Martyny | 117—33.5 L |

ALFRED L. LEAVITT, Primary Examiner

U.S. Cl. X.R.

117—97, 119.8